United States Patent
Zhao et al.

(10) Patent No.: US 9,516,494 B2
(45) Date of Patent: Dec. 6, 2016

(54) METHOD AND DEVICE FOR REPORTING CAPABILITY OF UE

(75) Inventors: Yali Zhao, Beijing (CN); Fangli Xu, Beijing (CN); Shouning Jiang, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 341 days.

(21) Appl. No.: 14/238,492

(22) PCT Filed: Aug. 2, 2012

(86) PCT No.: PCT/CN2012/079578
§ 371 (c)(1),
(2), (4) Date: Mar. 28, 2014

(87) PCT Pub. No.: WO2013/023531
PCT Pub. Date: Feb. 21, 2013

(65) Prior Publication Data
US 2014/0219170 A1    Aug. 7, 2014

(30) Foreign Application Priority Data
Aug. 12, 2011 (CN) .......................... 2011 1 0231335

(51) Int. Cl.
*H04W 8/24* (2009.01)

(52) U.S. Cl.
CPC ..................................... *H04W 8/24* (2013.01)

(58) Field of Classification Search
None
See application file for complete search history.

(56) References Cited

U.S. PATENT DOCUMENTS

| | | | |
|---|---|---|---|
| 2010/0284376 A1 | 11/2010 | Park et al. | |
| 2012/0008600 A1* | 1/2012 | Marinier | H04L 5/001 370/336 |
| 2012/0063425 A1 | 3/2012 | Wang et al. | |
| 2012/0327821 A1* | 12/2012 | Lin | H04W 72/048 370/280 |
| 2013/0010716 A1* | 1/2013 | Dinan | H04W 76/025 370/329 |
| 2015/0103811 A1 | 4/2015 | Marinier et al. | |

FOREIGN PATENT DOCUMENTS

| | | |
|---|---|---|
| CN | 101860964 A | 10/2010 |
| CN | 101888648 A | 11/2010 |
| CN | 102118873 A | 7/2011 |
| CN | 102291711 A | 12/2011 |
| EP | 2725861 A1 | 4/2014 |
| JP | 2013005366 A | 1/2013 |
| JP | 2013516917 A | 5/2013 |
| KR | 20090076805 A | 7/2009 |

(Continued)

OTHER PUBLICATIONS

International Search Report for PCT/CN2012/079578 dated Nov. 15, 2012.

(Continued)

*Primary Examiner* — Andrew Lai
*Assistant Examiner* — Jamaal Henson
(74) *Attorney, Agent, or Firm* — Marshall, Gerstein & Borun LLP

(57) ABSTRACT

A method and device for reporting a capability of UE. A UE receives a capability querying message from a base station, and sends a capability reporting message to the base station. The capability reporting message contains multi-TA capability information of the UE through at least one of an explicit mode and an implicit mode.

17 Claims, 4 Drawing Sheets

(56) References Cited

FOREIGN PATENT DOCUMENTS

WO  WO-2011/085200 A1  7/2011
WO  WO-2013/112952 A1  8/2013

OTHER PUBLICATIONS

3rd Generation Partnership Project: Technical Specification Group Radio Access Network, Evolved Universal Terrestrial Radio Access (E-UTRA), Radio Resource Control (RRC), Protocol Specification (Release 10) (Jun. 2011).
CATT, Consideration on Multi-TA Capability, 3GPP TSG RAN WG2 Meeting #77bis, Jeju, Korean (retrieved Mar. 20, 2012).
Ericsson, Multiple TA with a single TAT, 3GPP TSG-RAN WG2 #74, Barcelona, Spain, (May 8-13, 2010).
Examination report, European patent application No. 12824581.8, dated Nov. 2, 2015.
Extended European Search Report, European Patent Application No. 12824581.8, Nov. 13, 2014.
Office Action (with English translation), Chinese patent application No. 201110231335.0, dated Jun. 18, 2013.
Office Action (with English translation), Japanese patent application No. 2014-524255, mailed Jan. 19, 2015.
Office Action (with English translation), Korean patent application No. 10-2014-7006048, mailed Mar. 27, 2015.

\* cited by examiner

METHOD AND DEVICE FOR REPORTING CAPABILITY OF UE

This application claims the benefit of priority from Chinese Patent Application, No. 201110231335.0, entitled "method and device for reporting capability of UE" and filed on Aug. 12, 2011, the entire content of which is hereby incorporated by reference.

TECHNICAL FIELD

The present disclosure relates to communication technologies, and more particularly to a method and device for reporting a capability of UE.

BACKGROUND

Compared with a peak rate of Long Term Evolution (LTE) system, a peak rate of LTE Advanced (LTE-A) system is improved greatly. A downlink rate and uplink rate of LTE-A system is required to be up to 1 Gbps and 500 Mbps respectively. Further, the LTE-A system is also required to be compatible with the LTE system. In order to improve the peak rate, enable the LTE-A system to be compatible with the LTE system and take full advantage of frequency resources, a Carrier Aggregation (CA) technology is introduced into the LTE-A system.

By the CA technology, multiple cells may be aggregated by a User Equipment (UE) at the same time. The UE may be a terminal device. These cells may belong to the same band. In this case, the CA technology is called an intra-band CA technology. These cells may also belong to different bands. In this case, the CA technology is called an inter-band CA technology. No matter whether these cells belong to the same band, as long as the capability of the UE can support the aggregation of these cells, these cells may provide a data transmission service for the UE at the same time. In order to enable the LTE-A system to be compatible with the LTE system, the maximum bandwidth of each cell may be 20 MHz, and bandwidth between member carriers may be the same or different.

Time Alignment (TA) mechanism may ensure that uplink signals of all cells aggregated by a UE reach a base station at the same time to avoid interference. For the UE, non-synchronous uplink data transmission should be avoided.

LTE-A R10 only supports a single-TA scenario, in which TAs of all cells aggregated by the UE are the same.

A multi-TA scenario is introduced into LTE-A R11, in which TAs of all cells aggregated by the UE may be different. The multi-TA scenario may be an inter-band CA scenario or an intra-band CA scenario. In the intra-band CA scenario, data transmission of partial cells belonging to this band passes through a Remote Radio Head (RRH) or a repeater.

Several multi-TA scenarios that have been defined by 3rd Generation Partnership Project (3GPP) are described as follows.

In scenario 1, as shown in FIG. 1, the UE aggregates F1 and F2, the coverage of F1 is smaller than the coverage of F2, and F1 and F2 belong to different bands. That is, the scenario 1 is the inter-band CA scenario.

In scenario 2, as shown in FIG. 2, the UE aggregates F1 and F2, and F1 and F2 belong to different bands. That is, the scenario 2 is the inter-band CA scenario.

In scenario 3a, as shown in FIG. 3, the UE aggregates F1 and F2, F1 and F2 belong to the same band, but F2 passes through a repeater. That is, the scenario 3a is the intra-band CA scenario, but data transmission of partial cells passes through a repeater.

In scenario 3b, as shown in FIG. 3, the UE aggregates F1 and F2, F1 and F2 belong to different bands, and F2 passes through a repeater. That is, the scenario 3b is the inter-band CA scenario, and data transmission of partial cells passes through a repeater.

In scenario 4a, as shown in FIG. 4, the UE aggregates F1 and F2, F1 and F2 belong to the same band, but F2 passes through a repeater. That is, the scenario 4a is the intra-band CA scenario, but data transmission of partial cells passes through a RRH.

In scenario 4b, as shown in FIG. 4, the UE aggregates F1 and F2, F1 and F2 belong to different bands, and F2 passes through a repeater. That is, the scenario 4b is the inter-band CA scenario, but data transmission of partial cells passes through a RRH.

In order to maintain TAs in a multi-TA system, a concept of TA group is introduced. Uplink Component Carriers (UL CCs) of cells belonging to one TA group may use the same TA value, and UL CCs of cells belonging to different TA groups use different TA values. As long as the UE keeps uplink synchronization with one cell in a TA group, the UE may keep uplink synchronization with all cells in the TA group.

A TA group including a Primary Cell (PCell) may be called a PCell TA group (PTAG), and a TA group including a Secondary Cell (SCell) may be called a SCell TA group (STAG).

After the UE accesses a network, the network may query the capability of the UE. After receiving a capability querying request from the network, the UE reports the capability of the UE to a base station.

A signaling process of reporting the capability of the UE is shown in FIG. 5.

Based on the capability of UE in LTE R8/9, some new capabilities may be added to a UE in LTE-A R10 through non Critical Extension. The new capability may include a UE-category capability, a Radio Frequency (RF) capability, a measurement capability, an incontinuous resources assigning capability and so on. The Radio Frequency (RF) capability provides all BandCombination that may be aggregated by the UE.

A BandCombination Information Element (IE) includes two parameters, CABandwidthClass and a Multiple-Input Multiple-Output (MIMO) capability. CABandwidthClass defines the number of CCs that may be aggregated by the UE, as shown in Table 1.

TABLE 1

The definition of CABandwidthClass

| CABandwidthClass | aggregated transmission bandwidth (denoted with Physical Resource Block (PRB)) | the number of supported CCs |
| --- | --- | --- |
| A | $N \leq 100$ | 1 |
| B | $N \leq 100$ | 2 |
| C | $100 < N \leq 200$ | 2 |
| D | $200 < N \leq 300$ | undetermined |
| E | $300 < N \leq 400$ | undetermined |
| F | $400 < N \leq 500$ | undetermined |

In LTE-A R10, because only intra-band aggregation is supported in uplink, the aggregated cells indicated in the BandCombination all belong to this band.

The inventors find following problems in the prior art.

According to the multi-TA scenarios defined by 3GPP, multiple TAs should be considered in LTE-A R11, but a capability of supporting multiple TAs is not needed for the UE in LTE-A R11. And thus, it is required to consider how the UE reports to a base station information indicating whether the UE supports a multi-TA capability.

SUMMARY

Embodiments of the present disclosure provide a method and device for reporting a capability of UE, thereby solving the problem that the UE is unable to report its multi-TA capability information.

According to an embodiment, a method for reporting a capability of UE includes:

receiving, by the UE, a capability querying message from a base station; and sending, by the UE, a capability reporting message to the base station, wherein the capability reporting message contains multi-Time Alignment (TA) capability information of the UE through at least one of an explicit mode and an implicit mode.

According to another embodiment, a UE includes:

a receiving module, to receive a capability querying message from a base station; and a sending module, to send a capability reporting message to the base station, wherein the capability reporting message contains multi-Time Alignment (TA) capability information of the UE through at least one of an explicit mode and an implicit mode.

According to another embodiment, a method for reporting a capability of UE includes:

sending, by a base station, a capability querying message to the UE;

receiving, by the base station, a capability reporting message from the UE, wherein the capability reporting message contains multi-Time Alignment (TA) capability information of the UE through at least one of an explicit mode and an implicit mode; and determining, by the base station according to the multi-TA capability information of the UE contained in the capability reporting message, whether the UE supports a multi-TA capability.

According to another embodiment, a base station includes:

a sending module, to send a capability querying message to a UE;

a receiving module, to receive a capability reporting message from the UE, wherein the capability reporting message contains multi-Time Alignment (TA) capability information of the UE through at least one of an explicit mode and an implicit mode; and a determining module, to determine, according to the multi-TA capability information of the UE contained in the capability reporting message, whether the UE supports a multi-TA capability.

Compared with conventional technologies, the solution of the present disclosure has following advantages.

By the solution of the present disclosure, after receiving the capability querying message from the base station, the UE sends the capability reporting message to the base station, wherein the capability reporting message contains the multi-TA capability information of the UE through at least one of the explicit mode and the implicit mode. Accordingly, the multi-TA capability information of the UE may be reported to the base station, and thus the base station may learn the capability of the UE accurately.

DETAILED DESCRIPTION

As mentioned in the background, when a UE supporting a multi-TA capability in LTE-A R11 initially accesses a network, a base station queries the capability of the UE. However, it is not needed in the prior art to report to the base station whether the UE supports the multi-TA capability, which is contrary to a scenario that multiple TAs should be considered in LTE-A R11. Accordingly, the base station is unable to learn whether the UE supports the multi-TA capability.

In order to solve the problem, an embodiment of the present disclosure provides a method for reporting a capability of a UE. By the method, after receiving a capability querying message from the base station, the UE may send a capability reporting message to the base station, wherein the capability reporting message contains multi-TA capability information of the UE through at least one of an explicit mode and an implicit mode. Accordingly, the multi-TA capability information of the UE may be reported to the base station, and thus the base station may learn the capability of the UE accurately.

Figure 1:
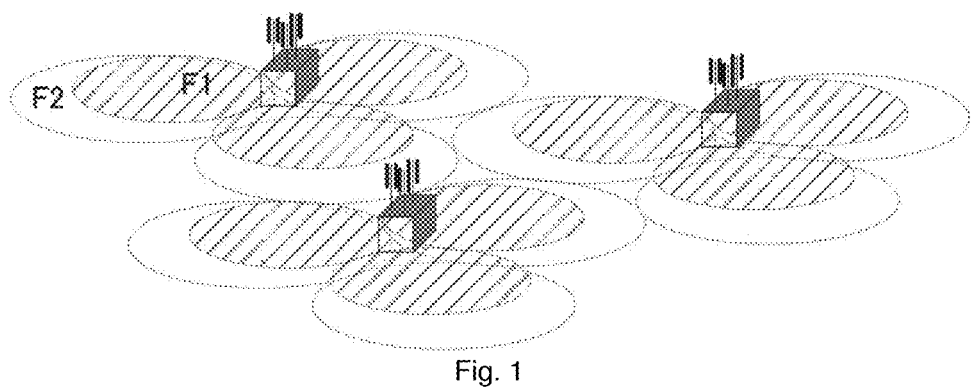
FIG. 1 is a diagram illustrating scenario 1 in multi-TA scenarios defined by 3GPP in the prior art.
Figure 2:
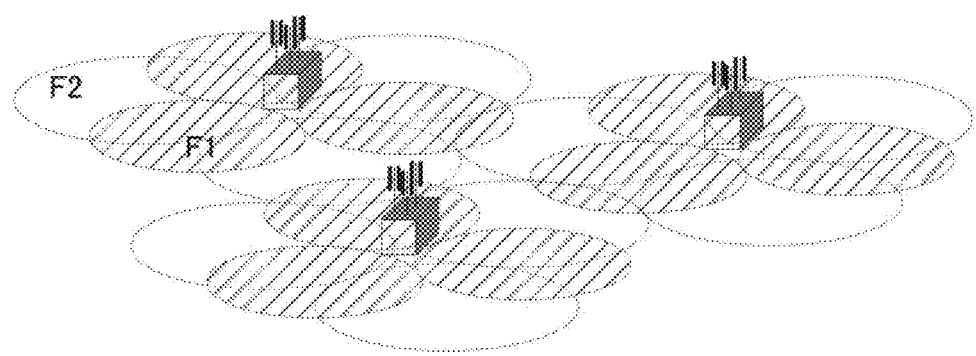
FIG. 2 is a diagram illustrating scenario 2 in multi-TA scenarios defined by 3GPP in the prior art.
Figure 3:
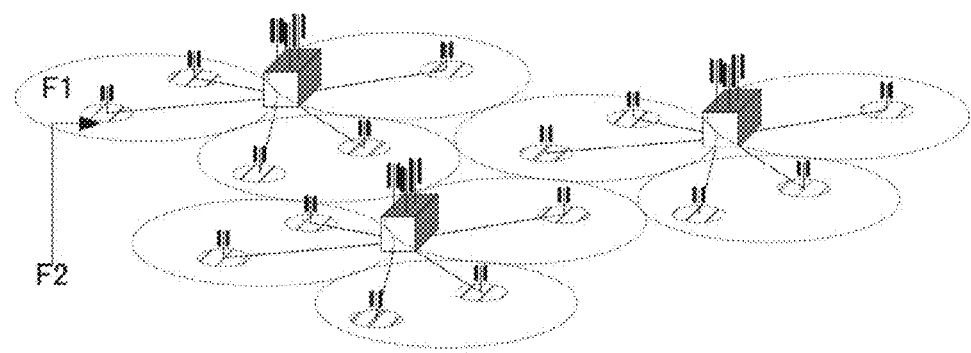
FIG. 3 is a diagram illustrating scenarios 3a and 3b in multi-TA scenarios defined by 3GPP in the prior art.
Figure 4:
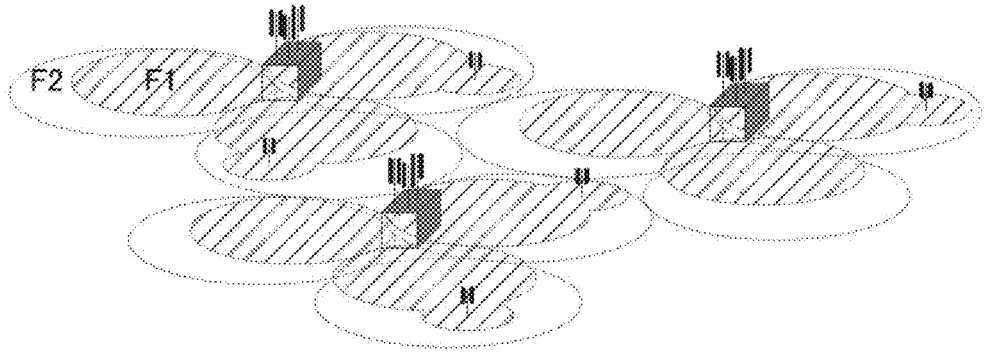
FIG. 4 is a diagram illustrating scenarios 4a and 4b in multi-TA scenarios defined by 3GPP in the prior art.
Figure 5:
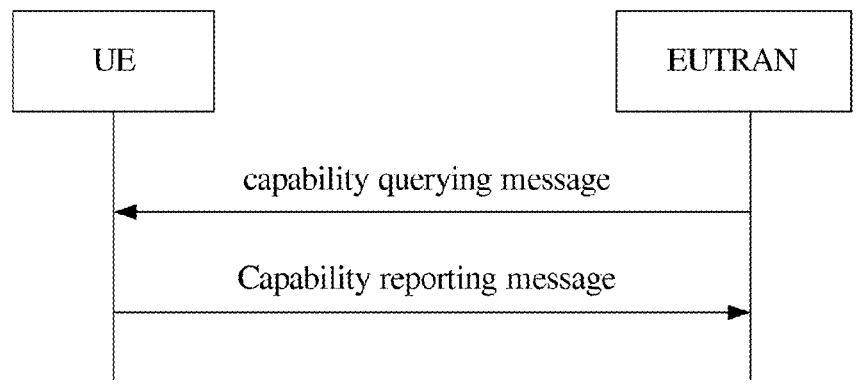
FIG. 5 is a diagram illustrating a signaling process of reporting a capability of UE in the prior art.
Figure 6:
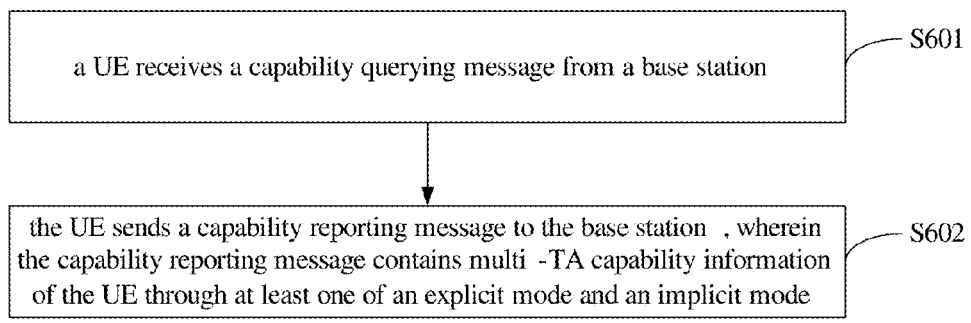
FIG. 6 is a flowchart illustrating a method for reporting a capability of UE according to an embodiment of the present disclosure.

FIG. 6 is a flowchart illustrating a method for reporting a capability of UE according to an embodiment of the present disclosure. As shown in FIG. 6, the method includes following blocks.

At block S601, a UE receives a capability querying message from a base station.

At block S602, the UE sends a capability reporting message to the base station, wherein the capability reporting message contains multi-TA capability information of the UE through at least one of an explicit mode and an implicit mode.

As can be seen from block S602, there are three modes for containing the multi-TA capability information of the UE.

In a first mode, the capability reporting message contains the multi-TA capability information of the UE through the explicit mode. In actual applications, the first mode may be implemented by one of following three implementations.

In an implementation (1), the capability reporting message may contain information indicating whether the UE supports the multi-TA capability.

In actual applications, the information indicating whether the UE supports the multi-TA capability may be represented with 1 bit.

In the implementation (1), optionally, the capability reporting message may contain information indicating the number of TA groups supported by the UE.

In actual applications, the information indicating the number of TA groups supported by the UE may be represented with one or more bits.

In an implementation (2), the capability reporting message may contain the information indicating the number of TA groups supported by the UE.

In actual applications, the information indicating the number of TA groups supported by the UE may be represented with one or more bits.

In an implementation (3), the capability reporting message may contain information indicating whether the multi-TA capability is supported for each BandCombination that is reported by the UE.

In actual applications, at least one piece of following information may be indicated in each BandCombination: the information indicating whether the multi-TA capability is supported for the BandCombination, the information indicating the number of TA groups supported by the Band-Combination, and information indicating whether each band in the BandCombination is a single TA group.

Furthermore, the UE may report the multi-TA capability in various carrier aggregation cases only for the bandcombiantion that includes only one band.

In a second mode, the capability reporting message contains the multi-TA capability information of the UE through the implicit mode. In actual applications, the second mode may be implemented by one of following two implementations.

In an implementation (1), BandCombination information contained in the capability reporting message implicitly contains the information indicating whether the UE supports the multi-TA capability, so that the base station may determine according to the BandCombination information whether the UE supports the multi-TA capability.

RF capability information contained in the capability reporting message contains the BandCombination information. The BandCombination information indicates whether the UE supports inter-band aggregation. If the UE supports inter-band aggregation, the UE supports the multi-TA capability.

In actual applications, when the BandCombination information contained in the capability reporting message implicitly contains the information indicating whether the UE supports the multi-TA capability, the BandCombination information also indicates the number of bands that may be aggregated at most by the UE, so that the base station may determine, according to the BandCombination information, the number of TA groups that may be supported at most by the UE.

In an implementation (2), a relationship between UE category information of the UE and information indicating whether the UE supports the multi-TA capability is predetermined. The capability reporting message contains the UE category information of the UE, so that the base station may determine according to the UE category information whether the UE supports the multi-TA capability.

In actual applications, the second mode may be applied to an inter-band aggregation scenario.

In a third mode, the capability reporting message contains the multi-TA capability information of the UE through the explicit mode and the implicit mode. In actual applications, the capability information reporting process may be implemented by combining the implementation (3) of the first mode with any one implementation of the second mode, which may refer to the foregoing description and is not illustrated herein.

No matter which mode is adopted, if the capability reporting message needs to contain the number of TA groups supported by the UE, there are two counting modes, one of which counts the number of PTAGs and the number of STAGs, and the other of which only counts the number of STAGs.

After receiving the capability reporting message from the UE, which contains the multi-TA capability information of the UE through at least one of the explicit mode and the implicit mode, the base station determines according to the multi-TA capability information of the UE whether the UE supports the multi-TA capability. The mode for containing the multi-TA capability information in the capability reporting message may refer to the foregoing description and is not illustrated herein.

Compared with conventional technologies, the solution of the present disclosure has following advantages.

By the solution of the present disclosure, after receiving the capability querying message from the base station, the UE sends the capability reporting message to the base station, wherein the capability reporting message contains the multi-TA capability information of the UE through at least one of the explicit mode and the implicit mode. Accordingly, the multi-TA capability information of the UE may be reported to the base station, and thus the base station may learn the capability of the UE accurately.

With reference to actual applications, the solution of the present disclosure is described hereinafter.

In a first embodiment, an explicit mode corresponding to the implementation (1) of the foregoing first mode is adopted. In the first embodiment, the UE only reports 1 bits information through the capability reporting message.

If a UE in R11 intends to report the multi-TA capability information, the capability of the UE in R11 may be described by non-key extension in the capability of UE in R10. One bit may be added to indicate whether the UE supports the multi-TA capability. This bit may be represented with an enumerated type or a Boolean type.

An example is provided, in which words with underlines are extended information.

```
UE-EUTRA-Capability-v10xy-IEs ::= SEQUENCE {
    ue-Category-v10xy        INTEGER (6..8)        OPTIONAL,
    rf-Parameters-v10xy      RF-Parameters-v10xy   OPTIONAL,
    measParameters-v10xy     MeasParameters-v10xy
    OPTIONAL,
    interRAT-ParametersCDMA2000-v10xy
    IRAT-ParametersCDMA2000-1XRTT-v10xy             OPTIONAL,
    ue-BasedNetwPerfMeasParameters-r10
    UE-BasedNetwPerfMeasParameters-r10   OPTIONAL,
    nonCriticalExtension       UE-EUTRA-Capability-v11xy-IEs
    OPTIONAL
    }
    Further, the added 1bit information may be defined as follows.
    Modification mode 1:
UE-EUTRA-Capability-v11xy-IEs ::=SEQUENCE {
    supportMultiTA    ENUMERATED {supported}
```

-continued

```
OPTIONAL
    }
    Modification mode 2:
UE-EUTRA-Capability-v11xy-IEs ::=SEQUENCE {
    supportMultiTA      BOOLEAN
    }
    Modification mode 3:
UE-EUTRA-Capability-v11xy-IEs ::=SEQUENCE {
    supportMultiTA      ENUMERATED {n0, n1}
    }
```

In actual applications, modification modes are not limited to the foregoing description. As long as the same technical effects as the above modification modes can be achieved, other modification modes may also be applied to the solution of the present disclosure.

In a second embodiment, an explicit mode corresponding to the implementation (2) of the foregoing first mode is adopted. In the second embodiment, the UE only reports the number of supported TA groups through the capability reporting message.

Suppose the number of TA groups supported at most in R11 is N, the capability reporting message may be represented with an enumerated type, an integer type or a character type.

If the character type is used, the capability reporting message may be represented with xbit. The value of x may be equal to x=☐☐☐ Log$_2$N☐☐ (containing the number of PTAGs) or x=☐☐ Log$_2$(N−1)☐☐☐ (not containing the number of PTAGs, but containing the number of STAGs). The base station and the UE may appoint to use the same value. For example, if the latter value is used, the base station and the UE may appoint that the number of supported TA Groups (TAGs) is equal to the number of TAGs that is reported by the UE plus 1.

For example, if the number of TAGs supported at most by the UE is 5, the capability reporting message may be represented with 2 bits or 3 bits. The bits may be defined as shown in Table 2 and Table 3.

TABLE 2

The definition of 3 bit

| Bit value | Definition |
|---|---|
| 000 | 1 TAG (PTAG) is supported |
| 001 | 2 TAG is supported |
| 010 | 3 TAG is supported |
| 011 | 4 TAG is supported |
| 100 | 5 TAG is supported |
| 101 | 6 TAG is supported |

TABLE 3

The definition of 2 bit

| Bit value | Definition |
|---|---|
| 00 | 1 TAG is supported |
| 01 | 2 TAG is supported |
| 10 | 3 TAG is supported |
| 11 | 4 TAG is supported |

The format of related Radio Resource Control (RRC) signaling is described as follows, wherein words with underlines are extended information.

```
UE-EUTRA-Capability-v10xy-IEs ::= SEQUENCE {
    ue-Category-v10xy       INTEGER (6..8)
    OPTIONAL,
    rf-Parameters-v10xy     RF-Parameters-v10xy
    OPTIONAL,
    measParameters-v10xy    MeasParameters-v10xy
    OPTIONAL,
    interRAT-ParametersCDMA2000-v10xy
    IRAT-ParametersCDMA2000-1XRTT-v10xy     OPTIONAL,
    ue-BasedNetwPerfMeasParameters-r10
    UE-BasedNetwPerfMeasParameters-r10      OPTIONAL,
    nonCriticalExtension    UE-EUTRA-Capability-v11xy-IEs
    OPTIONAL
    }
    Modification mode 1 (enumerated type)
UE-EUTRA-Capability-v11xy-IEs ::=SEQUENCE {
    SupportTAGroupNumber    ENUMERATED {n1, n2, n3, n4,n5}
    (containing PTAGs)
    or
    SupportSTAGroupNumber   ENUMERATED {n0, n1, n2,n3,
    n4}(not containing PTAGs)
    or
    SupportSTAGroupNumber   ENUMERATED {n1, n2, n3,n4}
    OPTIONAL
    (not containing PTAGs)
    }
```

In this modification mode, "ni" represents that there are i TAGs. For example, n0 represents that there is 0 TAG.

```
    Modification mode 2 (integer type)
UE-EUTRA-Capability-v11xy-IEs ::=SEQUENCE {
    SupportTAGroupNumber    INTEGER (1..5) (containing PTAGs)
    or
    SupportTAGroupNumber    INTEGER (0..4) (not containing
    PTAGs)
    or
    SupportTAGroupNumber    INTEGER (1..4) OPTIONAL (not
    containing PTAGs)
    }
    Modification mode 3 (character type)
UE-EUTRA-Capability-v11xv-IEs ::=SEQUENCE {
    SupportSTAGroupNumber   BIT STRING (SIZE(3))
    (containing PTAGs)
    or
    SupportSTAGroupNumber   BIT STRING (SIZE(3)) (not
    containing PTAGs
    or
    SupportSTAGroupNumber   BIT STRING (SIZE(2))
    OPTIONAL (not containing PTAGs)
    }
```

In actual applications, modification modes are not limited to the foregoing description. As long as the same technical effects as the above modification modes can be achieved, other modes may also be applied to the solution of the present disclosure.

In a third embodiment, an explicit mode corresponding to the implementation (3) of the foregoing first mode is adopted. In the third embodiment, the UE may report the multi-TA capability based on BandCombination.

There are several extension modes for extending Band-Combination defined by the capability of UE in R10.

In a first extension mode, the UE reports information indicating whether the multi-TA capability is supported for each BandCombination.

Figure 7:
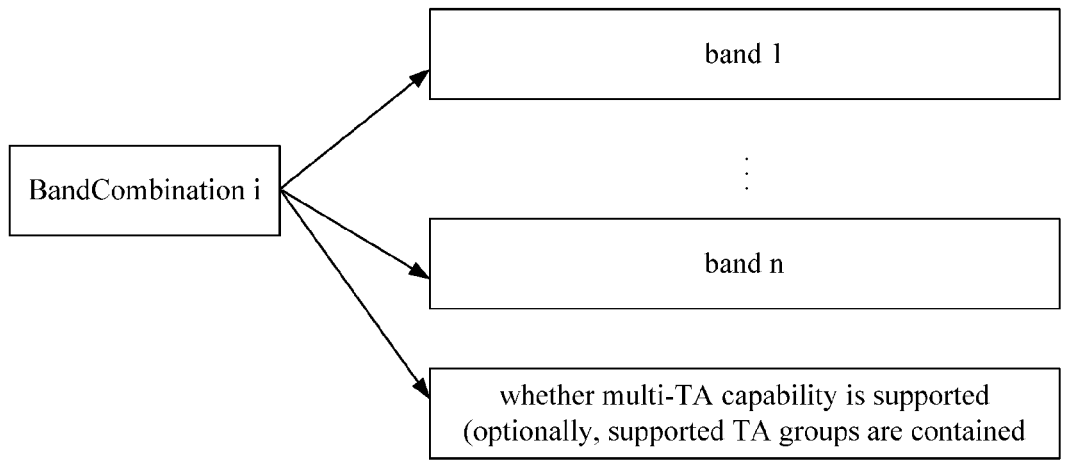
FIG. 7 is a diagram illustrating the structure of Band-Combination according to an embodiment of the present disclosure.

For example, at least one piece of following information may be added into a BandCombination parameter which is one RF parameter of R11: information indicating whether the multi-TA capability is supported for each BandCombination, information indicating the number of TA groups supported by each BandCombination, and information indicating whether each band in the BandCombination is a single TA group. An example is described, in which the information indicating whether the multi-TA capability is supported for each BandCombination is added into the BandCombination parameter, as shown in FIG. 7. The information indicating whether the multi-TA capability is supported for each BandCombination (optionally, the information indicating the number of TA groups supported by each BandCombination) is newly added. Furthermore, it may be restricted that the information indicating whether the multi-TA capability is supported for each BandCombination only appears in case of intra-band CA scenario.

In a second extension mode, whether the multi-TA capability is supported is only reported for the intra-band CA scenario, and optionally, the number of supported TA groups may also be reported.

Figure 8:
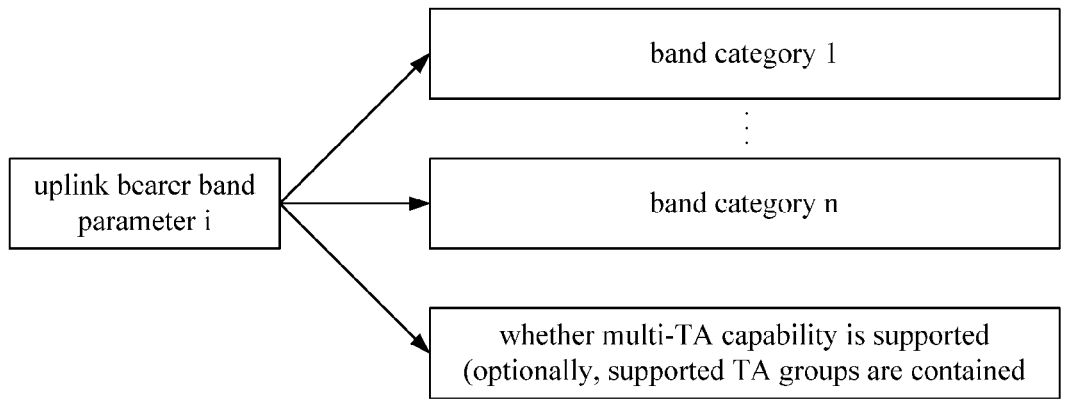
FIG. 8 is a diagram illustrating the structure of Band-Combination according to another embodiment of the present disclosure.

For example, a CA-MIMO-ParametersUL parameter that is a UL CA&MIMO capability indication in R11 is shown in FIG. 8. The information indicating whether the multi-TA capability is supported for each BandCombination (optionally, the information indicating the number of TA groups supported by each BandCombination) is newly added. The information indicating whether the multi-TA capability is supported for each BandCombination may appear in any scenarios, or only appear in the intra-band CA scenario.

In a fourth embodiment, an implicit mode corresponding to the implementation (1) of the foregoing second mode is adopted. In the fourth embodiment, the base station may determine, according to the inter-band CA of the UE, whether the UE supports the multi-TA capability.

The UE reports the capability reporting message according to the format of BandCombination IE in R10, and the base station determines according to BandCombination whether the UE supports inter-band CA. If the UE supports inter-band CA, the UE supports the multi-TA capability.

In a fifth embodiment, an implicit mode corresponding to the implementation (2) of the foregoing second mode is adopted. In the fifth embodiment, the base station determines according to UE category information whether the UE supports the multi-TA capability.

In a protocol, a relationship between the UE category information of the UE and the information indicating whether the UE supports the multi-TA capability is predetermined. If the capability reporting message of the UE contains the UE category information, the base station may determine according to the UE category information whether the UE supports the multi-TA capability.

In a sixth embodiment, an implicit mode and an explicit mode are combined, which corresponds to the foregoing third mode.

For inter-band CA, whether the multi-TA capability is supported may be determined according to whether inter-band CA is supported. For intra-band CA, whether the multi-TA capability is supported may be determined according to the information indicated in the capability reporting message of the UE. The information indicated in the capability reporting message of the UE may use the format in the third embodiment.

Compared with conventional technologies, the solution of the present disclosure has following advantages.

By the solution of the present disclosure, after receiving the capability querying message from the base station, the UE sends the capability reporting message to the base station, wherein the capability reporting message contains the multi-TA capability information of the UE through at least one of the explicit mode and the implicit mode. Accordingly, the multi-TA capability information of the UE may be reported to the base station, and thus the base station may learn the capability of the UE accurately.

Figure 9:
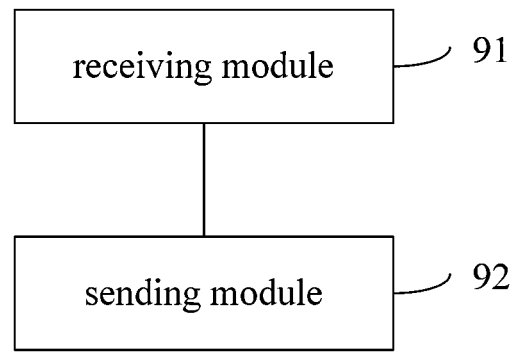
FIG. 9 is a diagram illustrating the structure of a UE according to an embodiment of the present disclosure.

An embodiment of the present disclosure provides a UE, as shown in FIG. 9. The UE includes following modules.

A receiving module 91 receives a capability querying message from a base station.

A sending module 92 sends a capability reporting message to the base station, wherein the capability reporting message contains multi-TA capability information of the UE through at least one of an explicit mode and an implicit mode.

In an implementation, the sending module 92 sends the capability reporting message containing information indicating whether the UE supports the multi-TA capability.

In another implementation, the sending module 92 sends the capability reporting message containing information indicating the number of TA groups supported by the UE.

In another implementation, the sending module 92 sends the capability reporting message containing information indicating whether the multi-TA capability is supported for each BandCombination that is reported by the UE.

The sending module 92 sends the capability reporting message containing BandCombination information supported by the UE, so that the base station may determines according to the BandCombination information whether the UE supports the multi-TA capability.

In another implementation, the sending module 92 sends the capability reporting message containing UE category information of the UE. A relationship between the UE category information and the information indicating whether the UE supports the multi-TA capability is predetermined, so that the base station may determine according to the UE category information whether the UE supports the multi-TA capability.

Figure 10:
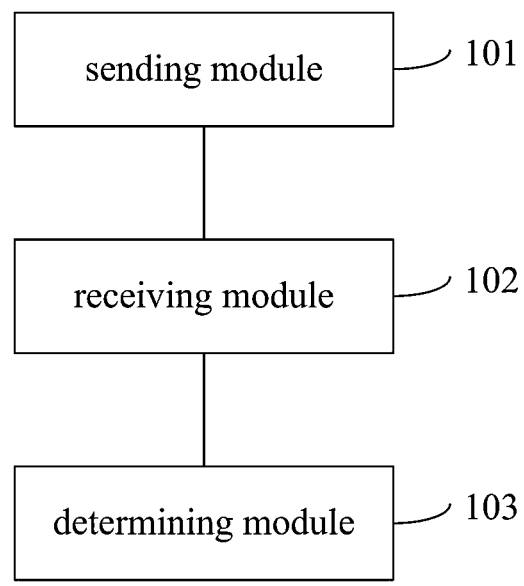
FIG. 10 is a diagram illustrating the structure of a base station according to an embodiment of the present disclosure.

An embodiment of the present disclosure provides a base station, as shown in FIG. 10. The base station includes following modules.

A sending module 101 sends a capability querying message to a UE.

A receiving module 102 receives a capability reporting message from the UE. The capability reporting message contains multi-TA capability information of the UE through at least one of an explicit mode and an implicit mode.

A determining module 103 determines, according to the multi-TA capability information of the UE contained in the capability reporting message received by the receiving module 102, whether the UE supports the multi-TA capability.

In an implementation, the receiving module 102 receives the capability reporting message containing information indicating whether the UE supports the multi-TA capability.

In another implementation, the receiving module 102 receives the capability reporting message containing information indicating the number of TA groups supported by the UE.

In another implementation, the receiving module 102 receives the capability reporting message containing information indicating whether the multi-TA capability is supported for each BandCombination that is reported by the UE.

When the receiving module 102 receives the capability reporting message containing the information indicating whether the multi-TA capability is supported for each BandCombination that is reported by the UE, the determining module 103 determines, according to the information indicating whether the multi-TA capability is supported for each BandCombination, whether the UE supports the multi-TA capability.

In another implementation, a relationship between UE category information of the UE and the information indicating whether the UE supports the multi-TA capability is predetermined. When the receiving module 102 receives the capability reporting message containing the UE category information of the UE, the determining module 103 may determine according to the UE category information whether the UE supports the multi-TA capability.

Compared with conventional technologies, the solution of the present disclosure has following advantages.

By the solution of the present disclosure, after receiving the capability querying message from the base station, the UE sends the capability reporting message to the base station, wherein the capability reporting message contains the multi-TA capability information of the UE through at least one of the explicit mode and the implicit mode. Accordingly, the multi-TA capability information of the UE may be reported to the base station, and thus the base station may learn the capability of the UE accurately.

According to the description of the above embodiments, it may be clearly understood by those skilled in the art that the embodiments of the present disclosure may be realized by hardware or by software accompanying with necessary general hardware platforms. Based on this, the solution of the present disclosure may be in the form of a software product. The software product may be stored in a non-transitory storage medium (such as a CD-ROM, a flash memory disk or a mobile hard disk) and includes several instructions to make a computer device (such as a personal computer, a server or a network device) perform the method described in embodiments of the present disclosure.

It may be understood by those skilled in the art that the accompanying drawings are only schematic diagrams of some embodiments, and some modules or processes illustrated in the accompanying drawings may be not needed for the embodiments.

It may be understood by those skilled in the art that the modules illustrated in the device embodiment may be configured in the device of the embodiment according to embodiment descriptions, or may be located in one or more devices different from the above embodiment. The modules in above embodiment may be merged into one module, or may be divided into multiple sub-modules furthermore.

Sequence numbers in the above embodiments of the present disclosure are only used for descriptions, which don't demonstrate the good or better of the embodiments.

The foregoing is only embodiments of the present disclosure, and the protection scope of the present disclosure is not limited to this. Any modification that may be made by those skilled in the art should be covered in the protection scope of the present disclosure.

What is claimed is:

1. A method for reporting a capability of User Equipment (UE), comprising:
   receiving, by the UE, a capability querying message from a base station; and
   sending, by the UE, a capability reporting message to the base station, wherein the capability reporting message contains multi-Time Alignment (TA) capability information of the UE through one of an explicit mode and an implicit mode;
   wherein if the capability reporting message contains the multi-TA capability information of the UE through the explicit mode,
   the capability reporting message contains at least one piece of: information indicating whether the UE supports a multi-TA capability, or information indicating the number of TA groups supported by the UE; or
   the capability reporting message contains at least one piece of: information indicating whether a multi-TA capability is supported for each BandCombination that is reported by the UE, information indicating the number of TA groups supported by each BandCombination, or information indicating whether each band in each BandCombination is a single TA group.

2. The method of claim 1, wherein if the capability reporting message contains the information indicating whether the multi-TA capability is supported for each BandCombination that is reported by the UE,
   reporting, by the UE, the multi-TA capability only for the BandCombination including one band.

3. The method of claim 1, wherein if the capability reporting message contains the multi-TA capability information of the UE through the implicit mode,
   the BandCombination information contained in the capability reporting message implicitly contains information indicating whether the UE supports a multi-TA capability, so that the base station can determine according to the BandCombination information whether the UE supports the multi-TA capability; or
   a relationship between UE category information of the UE and information indicating whether the UE supports a multi-TA capability is predetermined, and the capability reporting message contains the UE category information of the UE, so that the base station can determine according to the UE category information whether the UE supports the multi-TA capability.

4. The method of claim 3, wherein if the BandCombination information contained in the capability reporting message implicitly contains the information indicating whether the UE supports the multi-TA capability,
   Radio Frequency (RF) capability information contained in the capability reporting message contains the BandCombination information, wherein the BandCombination information indicates whether the UE supports inter-band aggregation, and if the UE supports inter-band aggregation, the UE supports the multi-TA capability.

5. The method of claim 3, wherein if the BandCombination information contained in the capability reporting message implicitly contains the information indicating whether the UE supports the multi-TA capability, the BandCombination information indicates the number of bands that can be aggregated at most by the UE, so that the base station can determine, according to the BandCombination information, the number of TA groups that can be supported at most by the UE.

6. The method of claim 3, wherein the number of TA groups is equal to a sum of the number of Primary Cell (PCell) TA groups (PTAGs) and the number of Secondary Cell (SCell) TA groups (STAGs) or equal to the number of STAGs.

7. The method of claim 1, wherein the number of TA groups is equal to a sum of the number of Primary Cell (PCell) TA groups (PTAGs) and the number of Secondary Cell (SCell) TA groups (STAGs) or equal to the number of STAGs.

8. A User Equipment (UE), comprising:
   a processor and a non-transitory storage, wherein the non-transitory storage is to store one or more instructions to be executed by the processor, and the one or more instructions comprise:

a receiving instruction, to receive a capability querying message from a base station; and a sending instruction, to send a capability reporting message to the base station, wherein the capability reporting message contains multi-Time Alignment (TA) capability information of the UE through one of an explicit mode and an implicit mode;

wherein if the capability reporting message contains the multi-TA capability information of the UE through the explicit mode, the capability reporting message contains at least one piece of: information indicating whether the UE supports a multi-TA capability, or information indicating the number of TA groups supported by the UE; or the capability reporting message contains at least one piece of: information indicating whether a multi-TA capability is supported for each BandCombination that is reported by the UE, information indicating the number of TA groups supported by each BandCombination, or information indicating whether each band in each BandCombination is a single TA group.

9. The UE of claim 8, wherein if the capability reporting message contains the information indicating whether a multi-TA capability is supported for each BandCombination that is reported by the UE, reporting, by the UE, a multi-TA capability only for BandCombination including one band.

10. The UE of claim 8, wherein the sending instruction is to send the capability reporting message containing BandCombination information supported by the UE, so that the base station can determine according to the BandCombination information whether the UE supports a multi-TA capability; or the sending instruction is to send the capability reporting message containing UE category information of the UE, wherein a relationship between the UE category information and information indicating whether the UE supports a multi-TA capability is predetermined, so that the base station can determine according to the UE category information whether the UE supports the multi-TA capability.

11. A method for reporting a capability of User Equipment (UE), comprising:

sending, by a base station, a capability querying message to the UE;

receiving, by the base station, a capability reporting message from the UE, wherein the capability reporting message contains multi-Time Alignment (TA) capability information of the UE through one of an explicit mode and an implicit mode; and determining, by the base station according to the multi-TA capability information of the UE contained in the capability reporting message, whether the UE supports a multi-TA capability;

wherein if the capability reporting message contains the multi-TA capability information of the UE through the explicit mode, the capability reporting message contains at least one piece of: information indicating whether the UE supports the multi-TA capability, or information indicating the number of TA groups supported by the UE; or the capability reporting message contains at least one piece of: information indicating whether a multi-TA capability is supported for each BandCombination that is reported by the UE, information indicating the number of TA groups supported by each BandCombination, or information indicating whether each band in each BandCombination is a single TA group.

12. The method of claim 11, wherein if the capability reporting message contains the information indicating whether the multi-TA capability is supported for each BandCombination that is reported by the UE, reporting, by the UE, the multi-TA capability only for BandCombination including one band.

13. The method of claim 11, wherein if the capability reporting message contains the multi-TA capability information of the UE through the implicit mode, BandCombination information contained in the capability reporting message implicitly contains information indicating whether the UE supports a multi-TA capability, so that the base station can determine according to the BandCombination information whether the UE supports the multi-TA capability; or a relationship between UE category information of the UE and information indicating whether the UE supports a multi-TA capability is predetermined, and the capability reporting message contains the UE category information of the UE, so that the base station can determine according to the UE category information whether the UE supports the multi-TA capability.

14. The method of claim 13, wherein if the BandCombination information contained in the capability reporting message implicitly contains the information indicating whether the UE supports the multi-TA capability, Radio Frequency (RF) capability information contained in the capability reporting message contains the BandCombination information, wherein the BandCombination information indicates whether the UE supports inter-band aggregation, and if the UE supports inter-band aggregation, the UE supports the multi-TA capability.

15. The method of claim 13, wherein if the BandCombination information contained in the capability reporting message implicitly contains the information indicating whether the UE supports the multi-TA capability, the BandCombination information indicates the number of bands that can be aggregated at most by the UE, so that the base station can determine, according to the BandCombination information, the number of TA groups that can be supported at most by the UE.

16. The method of claim 13, wherein the number of TA groups is equal to a sum of the number of Primary Cell (PCell) TA groups (PTAGs) and the number of Secondary Cell (SCell) TA groups (STAGs) or equal to the number of STAGs.

17. The method of claim 11, wherein the number of TA groups is equal to a sum of the number of Primary Cell (PCell) TA groups (PTAGs) and the number of Secondary Cell (SCell) TA groups (STAGs) or equal to the number of STAGs.

* * * * *